United States Patent [19]
Berg

[11] 4,007,332
[45] Feb. 8, 1977

[54] ARTIFICIAL REVERBERATION SYSTEM
[76] Inventor: Arne L. Berg, 13709 Allanwood Road, La Puente, Calif. 91746
[22] Filed: July 18, 1975
[21] Appl. No.: 597,283
[52] U.S. Cl. .............................................. 179/1 J
[51] Int. Cl.² .................. H02K 33/18; H03H 9/30
[58] Field of Search .................... 179/1 J; 333/30 R

[56] References Cited
UNITED STATES PATENTS

| | | | |
|---|---|---|---|
| 3,110,771 | 11/1963 | Logan .................................. | 179/1 J |
| 3,138,219 | 6/1964 | Blizard ............................. | 333/30 R |
| 3,159,713 | 12/1964 | Lauber, Jr. .......................... | 179/1 J |
| 3,400,341 | 9/1968 | Sittig ................................. | 330/30 R |
| 3,742,140 | 6/1973 | Weingartner ....................... | 179/1 J |
| 3,931,598 | 1/1976 | Bongianni ......................... | 333/30 R |

Primary Examiner—William C. Cooper
Assistant Examiner—E. S. Kemeny
Attorney, Agent, or Firm—Bruce L. Birchard

[57] ABSTRACT

An improved artificial reverberation system utilizing a unitary electro-acousto-electrical transducer of the electro-dynamic type in combination with means for eliminating the driving signal from the delayed output signal, such means including out-of-phase-signal cancellation circuits or time multiplexing circuits coupled to or integral with the unitary transducer achieves a high order of discrimination between driving and reflected signals in the system, thus permitting the use of a single transducer for both injecting signals and extracting reverberation signals.

10 Claims, 4 Drawing Figures

ARTIFICIAL REVERBERATION SYSTEM

BACKGROUND OF THE INVENTION

The production of artificial reverberation has been achieved in many ways for electronic organs and other electrical musical instruments and for phonographs, audio amplifiers and other devices in which the introduction of reverberation is desirable to simulate, in the reproduced sound, the acoustics found in a large music hall. In general, the artificial electro-mechanical reverberation devices used to date have incorporated a driver, one or more torsionally driven springs and a pickup (separate from the driver) driven by the torsionally vibrating springs to produce an output signal which includes the original signal plus a multitude of delayed signals arising from that phase shifting and time delay of the original signal caused by torsional vibrations in the one or more springs of the system.

With advances in printed circuits and in other components of electronic apparatus the size of such apparatus has become dramatically smaller. However, the size of associated reverberation apparatus has not been significantly reduced up to the time of this invention. Further, cost has become an increasingly vital factor in electronic audio amplifiers and the use of separate transducers, which has been necessary prior to this invention, has prevented significant cost reductions in reverberation apparatus for audio systems. The use of separate input and output transducers has been dictated by the need to achieve a reasonable level of reflected signal relative to original signal (or rejection of the original signal) in the output composite signal from the reverberation unit.

Therefore, it is an object of the present invention to overcome in an electro-mechanical, artificial reverberation system, the problems and disadvantages set forth hereinbefore.

It is a still further object of the present invention to provide a compact, low-cost artificial reverberation unit.

It is an additional object of this invention to provide an artificial reverberation unit in which a single transducer at one end of the unit of reduced length provides the reverberation effects previously achievable only with a larger unit having separate input and output transducers.

SUMMARY OF THE INVENTION

The use in an artificial reverberation system of a single transducer for both driving the delay line and recovering the delayed signal is made possible by any of several techniques described herein which achieve the necessary degree of rejection of the original signal so that the output signal from the system is primarily or wholly the delayed signal. One involves the use of balanced, opposing fluxes and/or induced voltages. Another utilizes comparison of original signals from two sources in a differential amplifier. The third involves time sharing of a unitary coil used in the transducer for both driving the transducer and recovering the desired delayed signals.

BRIEF DESCRIPTION OF THE DRAWINGS

A better understanding of the present invention may be had from a consideration of the following detailed description, taken in conjunction with the accompanying drawings in which.

DETAILED DESCRIPTION OF THE PREFERRED EMBODIMENTS

Figure 1:
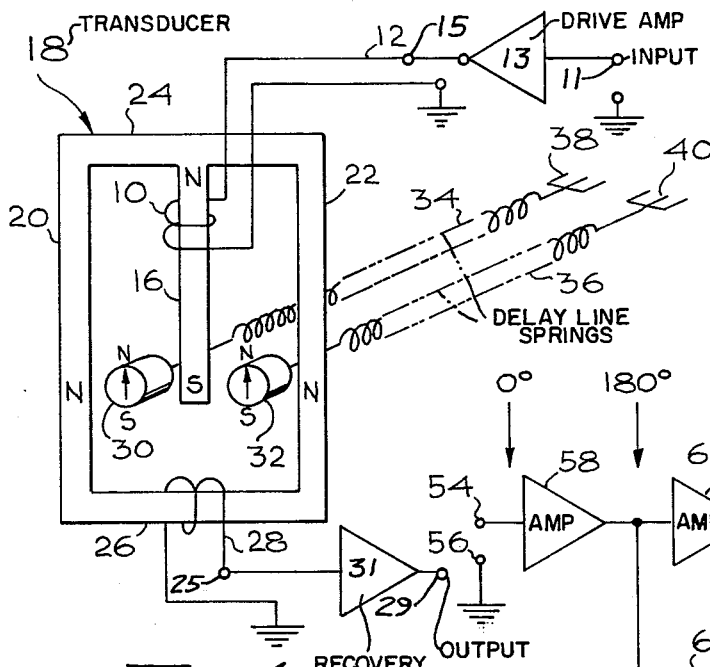
FIG. 1 is a schematic diagram of an electro-mechanical embodiment of the present invention.

In FIG. 1, signals at audio frequencies are applied from driving signal input terminal 11, through driver amplifier 13 to driver coil 10 through input leads 12 and 14. Driver coil 10 is wound about leg 16 of core 18 which includes, in addition to leg 16, side portions 20 and 22, upper core portion 24 and lower core portion 26.

Signal recovery or output coil 28 is wound centrally about core portion 26. A pair of magnets 30 and 32 (which may be ceramic in nature) are supported symmetrically between side 20 and leg 16 and side 22 and leg 16, respectively, for rotation about their respective axes. Magnets 30 and 32 are polarized as shown.

Coupled to magnets 30 and 32 and driven torsionally thereby to produce travelling waves are springs 34 and 36, respectively, those springs (in conventional applications) having differing spring constants and masses so as to have differing frequencies of natural resonance and differing signal phase shifting characteristics, thus enhancing the reverberation effects which are achieved with the device. In some applications springs with similar characteristics may be used.

Springs 34 and 36 are secured to a fixed clamping block or terminator at their ends 38 and 40 remote from core 18.

When an input signal is applied to terminals 12 and 14, at one instant the magnetic fields in the core 18 are as shown in FIG. 1. The result is counter-clockwise rotation of magnet 32 and clockwise rotation of magnet 30.

The effective incremental flux arising in output coil 28 as a result of the rotation of magnets 30 and 32 by the input or original is zero, essentially, since the flux changes will oppose each other within output coil 28 and the resulting output signal at output terminal 29 of recovery amplifier 31 resulting from the rotation of magnets 30 and 32 by the input or original signal will be, with complete balance, zero. Similarly, the variable flux cutting coil 28 from side portion 22 through core portion 26 as a result of the original signal applied to input coil 10 will be equal and opposite in direction to the flux cutting coil 28 as a result of flux flowing from side 20 into that coil. As a result, with complete symmetry, the output signal from coil 28 appearing at terminal 29 will contain none of the original or input signal. While total balance or symmetry is difficult to attain, experimental results have indicated that a high degree of rejection of the original signal can be attained with the balanced, single-ended configuration of FIg. 1. It should be understood that the number of driven springs is not limited to two but may be any integral multiple of two. Additional driven springs of different inherent characteristics can assure better broad-band frequency response for the reverberation system of FIG. 1.

Figure 2:
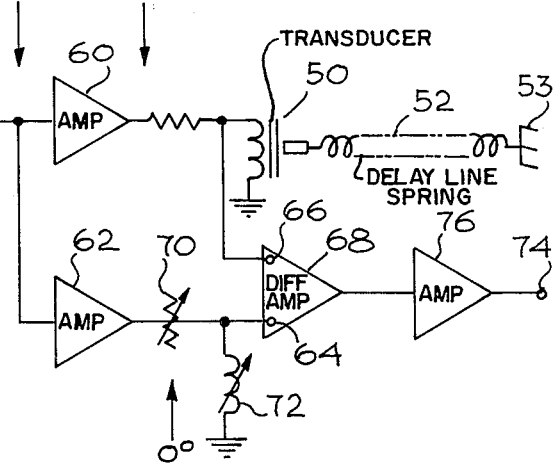
FIG. 2 is a schematic diagram of a largely electronic embodiment of the present invention.

Another approach to permitting the use of a single transducer for driving and recovering signals from a reverberation unit is shown in FIG. 2. In FIG. 2 a single transducer 50, which may be of the electro-dynamic type described in connection with FIG. 1, has its spring element 52 mechanically terminated, as is symbolized by grounding element 53 in FIG. 2.

An original or input signal is applied to terminals 54 and 56. That signal is amplified by voltage amplifier 58, driver amplifier 60 and applied to transducer 50. The signal applied to driver amplifier 60 is also applied to phase shifting amplifier 62. The output signal from phase shifting amplifier 62 and the input signal to transducer 50 are applied to the separate input terminals 64 and 66 of differential amplifier 68. Variable resistor 70 permits adjustment of the level of original signal applied to terminal 64 so that it equals the original signal level applied to terminal 66. Variable inductance 72 is adjusted to exhibit a reactance equivalent to that of transducer 50. When these adjustments have been made the original or common mode signals appearing at input terminals 64 and 66, being of the same magnitude and phase, will be cancelled in differential amplifier 68 and the single appearing at output terminal 74 of output amplifier 76 will be almost solely reflected or delayed signal. Of course, as in the embodiment of FIG. 1 the length of the spring in transducer 50 should be one-half of that normally used in a double-ended reverberation unit for the same time delay. Further, differential amplifier 68 may be replaced by a common-mode difference matrix circuit which cancels the common mode signal by adding common mode signals having opposite phases.

Figure 3:
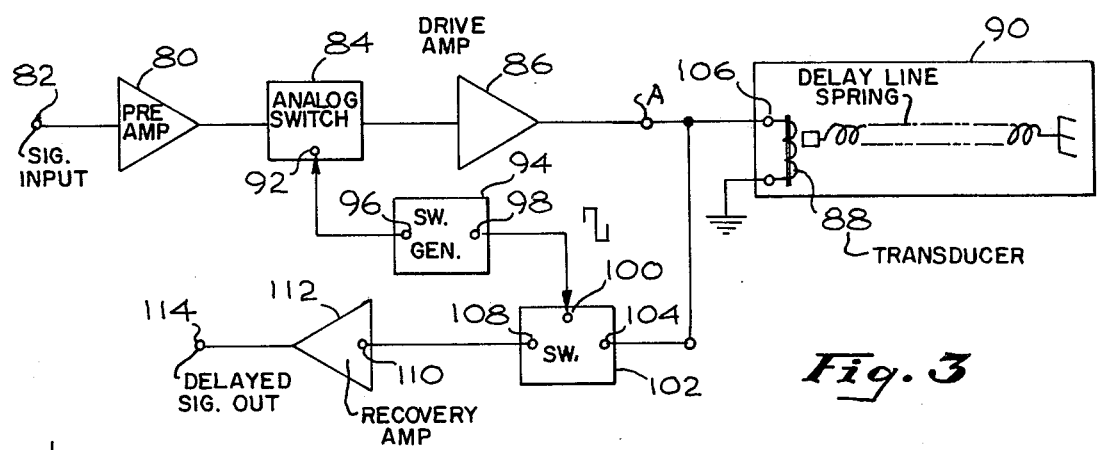
FIG. 3 is an additional, largely electronic embodiment of the present invention.

The circuit for a reverberation unit with a single transducer performing both the functions of driving the delay means, for example a spring, and recovering the delayed signal, with a high degree of elimination of the drive signal from the recovered signal is set forth in FIG. 3. In FIG. 3, the signal to be delayed is applied to preamplifier 80 through terminal 82. After its amplification in pre-amplifier 80, the signal to be delayed is coupled to an analog switch 84, the output of the switch being coupled to a drive amplifier 86, and thence, to the driver coil 88 of a reverberation unit 90, which may be of the torsionally-driven-spring variety. However, in this case, driver coil 88 functions both as the driver coil and the recovery, or pick-up-coil, as will be described more fully hereinafter. Circuits for analog switches are well known in the art. For example see *Fairchild Linear Integrated Circuits Data Catalog*, published in February, 1973.

Control terminal 92 of analog switch 84 has applied to it a switching pulse from output terminal 96 of switching-signal generator 94 which operates at a repetition rate outside the range of frequencies in the signal to be delayed. Control or switching signals or pulses of opposite polarity and of sinusoidal or, preferably, rectangular shape appear at output terminals 96 and 98, resepectively, of generator 94. Circuits for generating such pulses, including asymmetrical rectangular pulses are well known in the art and need not be described here. Various combinations of multivibrators may be used, for example. The pulses from terminal 98 and supplied, as control pulses, to the control terminal 100 of a second analog switch 102, the input terminal 104 of which is connected to terminal 106 of combination driver-pick-up coil 88. The output terminal 108 of analog switch 102 is coupled to input terminal 110 of recovery or output amplifier 112. Recovered, delayed audio signals appear at output terminal 114 of recovery amplifier 112. The term "audio signals" as used herein includes signals above and below, as well as within the human audible range of frequencies.

The driving and recovery circuits of FIG. 3 effectively share time on coil 88. This is accomplished by switching the driving and recovery circuits "on" alternately at a rate outside the range of frequencies in the driving signal. When switch 84 in the driving channel is providing audio signals to coil 88 for the purpose of driving the torsional delay line, output from the recovery channel is cut off by switch 102. Contrariwise, when reflected or delayed signals are being fed into associated circuits from output terminal 114, switch 92 is turned "off", preventing driving signals from being fed into the recovery channel. To prevent transient or ringing signals representing the original or driver signal and which may tend to appear across coil 88 when the driving signal is switched off, from passing through switch 102, the pulse from generator 94 which switches switch 102 on may be delayed with respect to the trailing edge of the pulse which turns switch 84 on. A delayed multivibrator which is well known in the art may be used to achieve this end. The pulse width of the pulse which turns on switch 102 may be less than the width of the pulse which turns on switch 84. Further, element 102 may take the form of a sample-and-hold circuit (which are well known in the art and need not be described here), with the clocking signal being derived from generator 94.

In some applications it may be desirable to combine the time-sharing concept of the circuit of FIG. 3 with the circuits of FIGS. 1 and 2 for optimum reverberation system performance.

Figure 4:
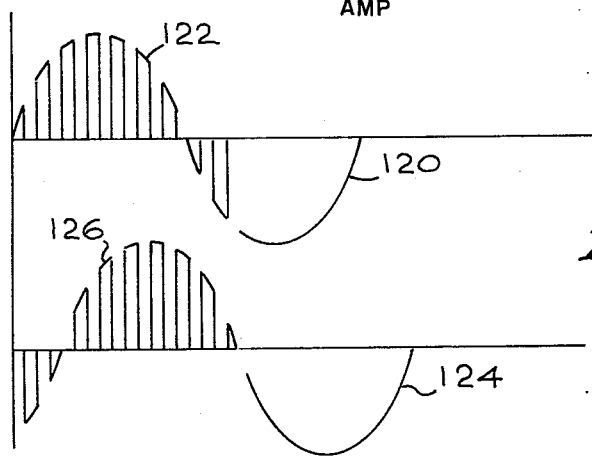
FIG. 4 is a graph explaining certain facets of the operation of the embodiment of FIG. 3.

In FIG. 4 the affects upon the input and recovered signals as a result of the chopping or switching action in the circuit of FIG. 3 are shown. Curve 120 represents one component of an input audio signal applied to input terminal 82. As a result of the switching action in analog switch 84 the signal applied to drive coil 88 comprises a series of pulses 122 of varying height, the envelope of those pulses being the original sine wave 120.

Curve 124 is the envelope of the recovered signal corresponding to the original signal 120. Curve 124 is shown as phase shifted or time delayed as a result of the action of the delay line in the system. The amount of delay illustrated is purely symbolic and does not represent an absolute amount. Further, in actual practice the amplitude of the recovered signal is a small fraction of the amplitude of the original, or driving, signal. The pulses 126 which make up the recovered signal are seen, from FIG. 4, to be present when the pulses 122 making up the original signal (as applied to the drive coil 88) are absent, or at zero level.

Because the rate of chopping the driving and recovered signals is outside the range of frequencies in the driving signal the chopping signal does not appear in the recovered or delayed signal. Also, the driving or original signal is turned off when the channel for the recovered or reverberation signal from coil 88 (operating in the pick-up mode) to output terminal 114 is complete, that is when analog switch 102 is closed. Consequently, no driving or original signal can appear at output terminal 114 and the desired total separation of driving and delayed signals is achieved.

The terms "original signal" and "driving signal" as used herein include a carrier signal on which the signal to be delayed has been impressed as well as the signal to be delayed, itself. Methods for modulating a carrier signal with a principal signal (in this case, the signal to be delayed) are well known and need not be described here.

Although there has been described hereinbefore particular apparatus and circuits for achieving reverberation of audio signals in minimum space and at minimum cost it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. An improved artificial reverberation system including:
   an original signal input terminal;
   a delayed signal output terminal;
   a unitary electrodynamic transducer coupled to both said input terminal and said output terminal;
   at least one spring coupled at one end to said transducer and at the other end to a fixed terminator;
   said unitary transducer being responsive to an original signal applied to said input terminal to produce a travelling wave in said at least one spring;
   said unitary transducer being responsive to a travelling wave reflected from said fixed terminator to produce a delayed signal at said output terminal;
   and rejection means coupled between said input and output terminals for minimizing the level of said original signal appearing at said output terminal.

2. Apparatus according to claim 1 in which said rejection means includes original-signal cancelling means.

3. Apparatus according to claim 1 in which said rejection means includes switching means for coupling said transducer alternately to said input terminal and said output terminal.

4. Apparatus according to claim 3 in which the frequency of alternation is outside the range of frequencies in said original signal.

5. Apparatus according to claim 2 in which said cancelling means includes a common mode difference matrix circuit.

6. Apparatus according to claim 2 in which said cancelling means includes balanced and opposing magnetic circuits in said transducer.

7. Apparatus according to claim 1 in which said transducer includes a common driving and pickup coil coupled to both said input and output terminals.

8. Apparatus according to claim 3 in which said switching means includes a first analog switch coupled between said input terminal and said transducer; a second analog switch coupled between said transducer and said output terminal and a multivibrator coupled to said first and second analog switches to cause alternate operation thereof.

9. Apparatus according to claim 1 in which said transducer includes a core having a pair of side portions, an upper portion, a lower portion and a centrally positioned leg extending from said upper portion to a point proximate to the middle of said lower portion;
   a driver coil wound about said leg;
   a recovery coil wound about the middle of said lower portion of said core in proximity to the end of said leg; and
   a first cylindrical magnet supported rotatably between one of said pair of sides of said core and said leg portion and coupled to a first spring;
   said rejection means including a second cylindrical magnet, substantially identical in size and polarity with said first cylindrical magnet, rotatably supported between the other of said pair of side portions of said core and said leg portion and coupled to a second spring.

10. Apparatus according to claim 3 in which said transducer includes a common driver-recovery coil.

* * * * *